(No Model.)
R. L. BONNELL.
BICYCLE GEARING.
No. 576,719.   Patented Feb. 9, 1897.
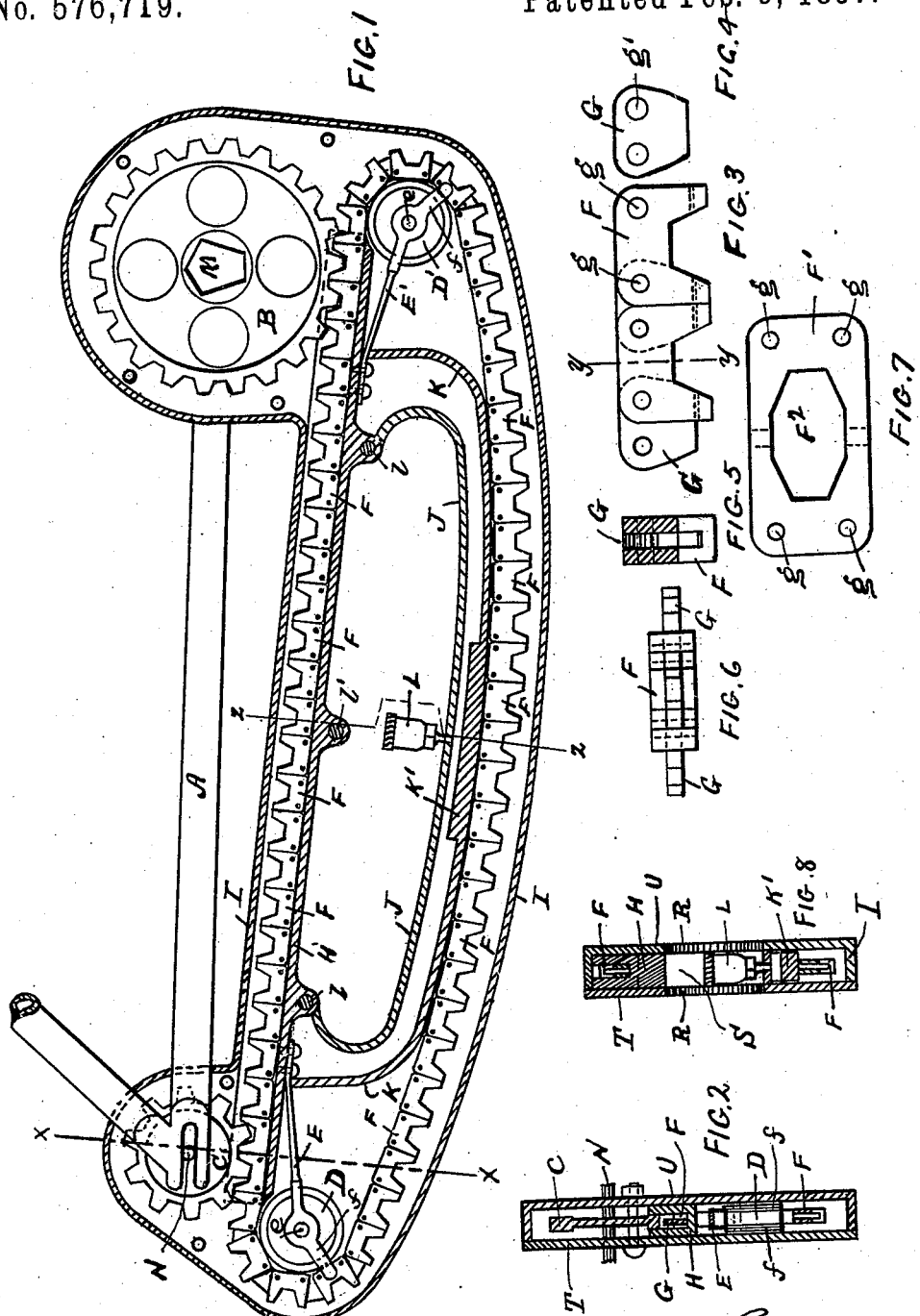
Witnesses:
M. C. Proctor
G. Hathaway
Inventor:
R. L. BONNELL
by Thurman and Silvius
ATTORNEYS.

UNITED STATES PATENT OFFICE.

ROBERT L. BONNELL, OF ANDERSON, INDIANA, ASSIGNOR TO THE COMBINATION BICYCLE LOCK AND GEAR COMPANY, OF SAME PLACE.

BICYCLE-GEARING.

SPECIFICATION forming part of Letters Patent No. 576,719, dated February 9, 1897.

Application filed April 21, 1896. Serial No. 588,415. (No model.)

*To all whom it may concern:*

Be it known that I, ROBERT L. BONNELL, a citizen of the United States, residing at Anderson, in the county of Madison and State of Indiana, have invented certain new and useful Improvements in Bicycle-Gearing; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to the wheels and chain comprising the gearing forming part of the propelling mechanism of bicycles and other like vehicles; and it consists of a certain novel form of chain, the details of construction thereof, and its general application in connection with gear or tooth wheels, together with a peculiar inclosing casing and other features, as will be more fully described hereinafter.

The objects of my invention are to provide a bicycle-gearing which shall obviate the objections inherent in other chains and gearing due to rapid wear and consequent elongation of the chain and wear of sprocket, to provide a gearing that is self-lubricating and which may be protected from contact with the clothing of the rider, and which may be operated with the least amount of friction and consequent retardation of the vehicle. With these objects in view my invention is of simple construction, cheaply manufactured, efficient, durable, and economical in use.

Referring to the drawings, Figure 1 represents a vertical longitudinal sectional view of the inclosing case and channel, showing a side view of chain and gear-wheels. Fig. 2 is a transverse sectional view on the line $xx$ of Fig. 1. Fig. 3 is a side view of a portion of the chain. Fig. 4 is a side view of an inside link. Fig. 5 is a transverse sectional view of outside link on the line $yy$ of Fig. 3. Fig. 6 is a plan view of a portion of the chain. Fig. 7 is a plan view of a plate from which an outside link is formed, and Fig. 8 is a transverse sectional view on the line $zz$ of Fig. 1.

In the drawings, A represents a part of the lower portion of a bicycle-frame to which is connected a driving-wheel B, carried by a crank-shaft M. At the rear of the frame, on the rear wheel N, is a wheel C. The wheels B and C are similar to sprocket-wheels, but differ slightly in that the teeth are greater in number, being closer together, presenting rather the appearance of two gear-wheels. These are made of suitable metal, as is usual.

Below the toothed wheels and extending from one to the other is a chain-channel H, suitably supported to the bicycle-frame, usually by means of the inclosing casing. At each end of the channel are secured brackets E E', having finger-guards $f$. Wheels D D' are rotatably supported in these brackets upon journaled axles $e$. The chain F meshes with the driving and driven toothed wheels and slides in the channel H, the back of the chain being straight and smooth, running in contact with the bottom of the channel and around the wheels D D', returning below. Surrounding the chain at bottom, a portion of the top, and portion of the gear-wheels is a casing I, having at one side a back U and at the opposite side a front T.

In some cases the front and back are constructed so as to form the sides of the channel H, which in that case comprises only the bottom of the channel. Below the channel is secured and connected therewith the upper portion J of the lower part of the chainway. This is attached by means of screws or rivets $l$. The front and back plates of the casing are secured by means of suitable screws or rivets $l'$, passing through suitable holes. Within the casing is suitably suspended a flexible strip K, of any suitable material, such as felt, having at its central part a portion K' of double or extra thickness, and above this portion, secured to the casing, is an oil-cup L, from which oil may be dropped to the flexible material below, and from there is taken up by the chain which slides in contact with it. It will be understood that the central portion of the chain-casing is open, as designated by R, S representing the end of the part J of the case, and the bottom of the channel covers the upper part of the opening.

A novel feature of my chain is the manner in which it is constructed, which is accomplished in a cheap and inexpensive manner. A plate F is formed in a die, and the central opening F² is punched out. At the four corners are punched or drilled holes $g$. The plate is bent on the dotted lines, bringing the two ends around until they form two parallel sides with a sufficient space between to admit the inside link G, provided with holes $g'$. The inside links are stamped out in a die and are solid. The inside links are inserted between the two sides of the outside link and are riveted therein pivotally in the usual manner. The inside link is of such size that when inserted the surface which comes in contact with the teeth of the gear-wheel presents a solid face, the inner link filling the opening in the outer link, extending up into the tooth thereof.

It will be noticed that as the driving gear-wheel is rotated the teeth thereof push against the chain, which being in contact with the rear or driven gear-wheel pushes it around instead of the chain being drawn as in ordinary sprocket-chain. As the links have a full bearing against each other when the chain is straight in the channel, no wear of the chain can occur. Therefore the constant annoyance of taking up the slack of a chain is obviated. As the chain is constantly lubricated and perfectly protected from dust, all friction is eliminated, insuring an easy-running wheel, fully protecting the clothing of the rider from contact both with the wheels and chain.

In manufacturing my gear I use such metals as are found to be the most desirable for such purposes.

Having described my invention, what I claim, and desire to secure by Letters Patent, is—

1. A bicycle-gearing comprising a toothed gear-wheel mounted on a crank-shaft, and toothed gear-wheel mounted on a rear or driving axle, an incased channel supported below and extending from one to the other of said toothed wheels, a wheel suitably mounted and supported to rotate at each end of said channel, a chain having a smooth back and serrated or toothed front, said front being in contact with the teeth of said wheels so that the driving-wheel may rotate the driven wheel by pressure against said chain, a casing surrounding said chain and wheels, a flexible strip of material supported within said casing, so as to be in contact with the back of said chain, and a suitable oil-cup mounted to deliver oil to said flexible strip, substantially as and for the purposes shown and described.

2. The combination of the bicycle-frame, the driving gear-wheel supported rotatably thereon, the toothed wheel mounted on the driven axle in engagement with the rear of said frame, the chain-channel supported on said frame below said toothed wheels, extending from one to the other, the rollers or wheels supported at the ends of said chain-channel, the chain engaging with said toothed wheels and running over said rollers and through said channel, the casing inclosing said channel, chain and wheels, said chain consisting of inside and outside links, the inside link being of solid form and the outside link being formed from a punched plate doubled over to form two parallel sides, between which are inserted and pivotally secured the said inside links, substantially as and for the purposes shown and described.

3. In a bicycle-gearing, the combination of the toothed wheel B mounted on the crank-shaft M; the toothed wheel C mounted on the rear axle; the channel H supported below said toothed wheels; the wheels D D' rotatably supported at each end of said channel; the casing I having the part J, the front T and back U; the chain F composed of inside links G and outside links formed from plates F', substantially as shown and for the purposes described.

4. In a bicycle, the combination of the wheels B C; the channel H; the chain F consisting of links G and links connecting therewith, formed from a plate F'; the flexible strip K supported to lubricate said chain, and a suitable case inclosing said wheels, said chain and said flexible strip, substantially as shown and described for the purposes set forth.

In testimony whereof I affix my signature in presence of two witnesses.

ROBERT L. BONNELL.

Witnesses:
WILLIAM S. DIVEN,
JAMES A. VAN OSDOL.